Feb. 26, 1952 J. A. BENNER ET AL 2,586,775
PLASTIC CONTAINER CLOSURE
Filed June 10, 1947
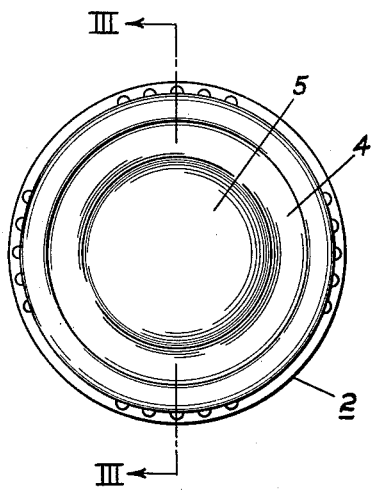
Fig. 1
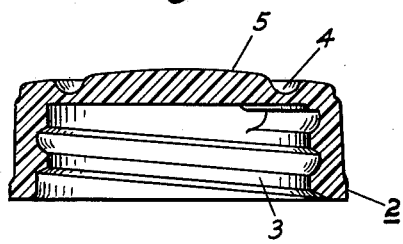
Fig. 3
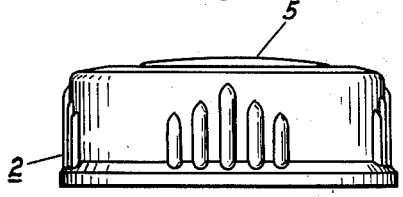
Fig. 2
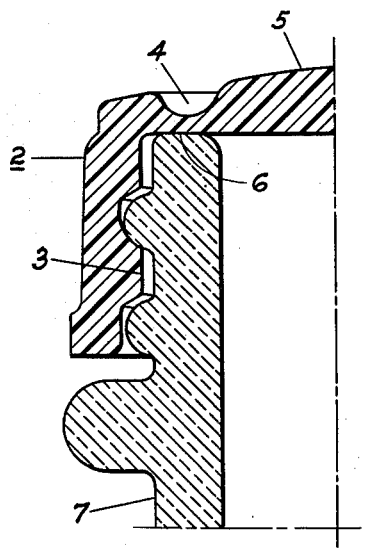
Fig. 4
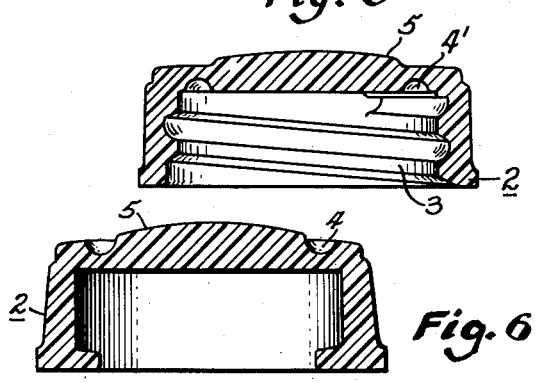
Fig. 5
Fig. 6
INVENTOR.
Joseph S. Benner
John M. Sharf
by
Walter & Kaufman, atty.

Patented Feb. 26, 1952

2,586,775

UNITED STATES PATENT OFFICE 2,586,775

PLASTIC CONTAINER CLOSURE

Joseph A. Benner, Lancaster, and John M. Sharf, Lancaster Township, Lancaster County, Pa., assignors to Armstrong Cork Company, Lancaster, Pa., a corporation of Pennsylvania Application June 10, 1947, Serial No. 753,700

6 Claims. (Cl. 215—43)

This invention relates to plastic container closures. More particularly, the invention relates to plastic container closures of the screw or lug type which may be employed for sealing containers without the necessity of using an additional sealing member, such as a washer or disc.

Numerous types of container closures have been manufactured from plastics. Probably the most widely employed plastics are phenolic type and urea-formaldehyde type. Plastic closures manufactured from such materials are widely employed in packaging liquids, pastes, creams, and the like. Closures manufactured from these plastics are comparatively rigid and, when used in conjunction with containers for packaging liquids, must be fitted with a suitable yielding liner of cork, cork composition, pulpboard, rubber, or other resilient material to prevent leakage or evaporation of the container contents.

In recent years, there have been developed resilient plastic materials, such as polyethylene, plasticized nylon, plasticized acrylic resins, plasticized vinyl resins, and the like. Attempts have been made to prepare plastic container closures from these resilient and flexible plastics and to employ such closures without the use of a liner or other sealing means within the closure. One method of forming a closure from resilient and flexible plastic material for use without a sealing disc or liner involves reducing the dome thickness of the closure in an effort to increase its resiliency and flexibility. Such configurations have not been suitable for use as linerless closures and, in addition, have been so readily deformed that a large number of a given quantity of thin-sectioned closures are rendered unsuitable for use during ordinary handling, including shipment, feeding to capping machines, and the like.

It is, accordingly, an object of this invention to provide a container closure manufactured from resilient and flexible plastic material and capable of being used without a sealing disc or liner in the packaging of various materials.

A further object of this invention is the provision of a plastic container closure having a flexing concentric section so located in the closure top that controllable stretch and flexing is obtained at the sealing surface when the closure is applied to a container.

Still another object of this invention is the provision of a plastic container closure having a side wall-top juncture maintained at a relatively heavy cross-section, thereby providing mechanical rigidity for not only the side wall but the related threads or lugs.

Still another object of this invention is the provision of a plastic container closure which may be readily manufactured on conventional molding equipment with but slight modification and at relatively low cost.

These and other objects of this invention will become apparent to those skilled in the art upon becoming familiar with the following description when taken in conjunction with the accompanying drawings in which like parts are designated by like numbers and in which, Figure 1 is a top plan view of the closure of our invention, Figure 2 is an end elevation of our closure, Figure 3 is a sectional view taken along the line 3—3 of Figure 1, Figure 4 is a sectional view in part of a closure applied to a container, and Figure 5 is a sectional view of a modification of our invention.

Figure 6 is a sectional view of another modification of our invention.

Referring to the drawings, the closure 2 comprises a threaded portion 3, and a top having an annular recess 4 and a dome 5. The annular recess 4 is advantageously so positioned that, when in sealing relationship with a container, as shown in Figure 4, the portion of the closure having the minimum thickness is positioned above the lip 6 of the container 7.

With this configuration, any typical commercial variation in the container finish is compensated for by the comparatively thin section immediately adjacent thereto and provided by the annular recess in the top of the closure. At the same time, the comparatively thick side wall end shoulder at the juncture of the top and side wall gives mechanical rigidity which is necessary to withstand the forces applied to a closure when applying the same to a container.

Plastic materials which may be used in the manufacture of our closure include suitably plasticized acrylic, vinyl resins, nylon, and vinylidene chloride resins. The materials employed are advantageously of such a nature that they are relatively rigid in heavy sections and relatively flexible in thin sections. A particularly advantageous plastic which may be employed in the manufacture of closures in accordance with our invention is the material known as "Polythene," which is a plastic material obtained by polymerizing ethylene. In addition to the required physical properties, ethylene polymer, also known as polyethylene, is resistant alkali, most acids, and is nontoxic and free of objectionable taste and odor.

The dimensions for a particular closure may be varied, depending, among other things, upon the type of container to which the closure is to be applied, as well as the particular plastic to be used in the manufacture of the closure. For example, in the manufacture of a screw type closure from "Polythene" to be used on a 28 mm. diameter container opening, the side wall may be approximately 0.100" thick, while the top section ranges from approximately 0.100" at the side wall-top juncture through a flexure zone provided by the annular recess of approximately 0.040" at the bottom to the center of the dome which is curved to give a maximum thickness of 0.125". Such dimensions in a cap of this type will give a stiff wall and thread section, a sturdy side wall-top juncture, a flexible zone at and/or adjacent the sealing point, and a dome of maximum thickness where resistance to puncture and/or vertical impact is most needed.

Although we do not intend to be limited by any theories expressed herein, it is believed that, when closures of the type described herein are applied to a container, the action may be considered as a concentric relatively nonyielding outer member pulling down a stiff platform represented by the thick center portion of the dome and allowing a floating compensation section provided by the annular recess between these two to yield or flex into matching conformity with the typicaly nonplanar surfaces of the bottle finish. The change in the configuration of the undersurface of the closure during application may vary, depending upon the particular plastic from which the closure is molded, the force employed in applying the closure, and the container finish. The somewhat diagrammatic sketch of Figure 4 is not intended to represent the actual configuration of the closure in sealing relationship with the container lip but merely serves to illustrate the general position of the annular recess with respect to a container lip in the preferred embodiment of our invention.

Screw-type caps were prepared in accordance with our invention and subjected to tests to show the mechanical sealing performance. These caps were tested against conventionally shaped caps molded from "Polythene" and containing the conventional top without an annular recess. The test caps were applied to an aluminum bottle finish, machined to the desired dimensions; the caps were tightened with known forces, and air pressure was applied through the bottle shape against the inside of the cap. The air pressure necessary to cause a leakage was determined, as observed by air bubbles escaping from the cap on the finish immersed in a water bath. The results obtained are given below in Table A in which the designations in pounds per square inch represent the pressure at which leakage occurred.

Table A

| Tightening Forces (Torque In. Lbs.) | Cap of Figure 1 | Conventional Cap Top |
|---|---|---|
| | lbs./sq. in. | lbs./sq. in. |
| 9-10 | 17 | 1 |
| 13-14 | 26 | 3 |
| 18-19 | 36 | 8 |

The caps of our invention were also subjected to evaporation tests in which one fluid ounce 28 mm. finish bottles were filled with a 50-50 grain alcohol-water mixture. To these filled containers were applied test closures with known tightening forces. The bottles were stored alternately upright and on sides at 105° F. The weight losses were determined at regular intervals. The results obtained on bottles stored upright for four days at 105° F. are shown in Table B in which the weight losses are given in grams.

Table B

| Tightening Forces (Torque In. Lbs.) | Cap of Figure 1 | Conventional Cap Top |
|---|---|---|
| | Grams | Grams |
| 9-10 | .0572 | .0968 |
| 13-14 | .0496 | .0920 |
| 18-19 | .0260 | .0475 |

The evaporation tests were continued by storing the bottles on sides for an additional three days, then upright for seven days, and next on sides for seven days. The results at the end of the three-week test period showing over-all weight losses in grams are given in Table C.

Table C

| Tightening Forces (Torque In. Lbs.) | Cap of Figure 1 | Conventional Cap Top |
|---|---|---|
| | Grams | Grams |
| 9-10 | .8556 | 1.5572 |
| 13-14 | .7026 | 2.0666 |
| 18-19 | .2892 | 0.8540 |

By means of our invention, we have provided a new plastic container closure which may be employed in the packaging of various liquids which are subject to evaporation at commercial handling and storage temperatures which are generally from 32° F. to 100° F. and may, in some instances, be slightly higher. Because of the particular construction of our closure, evaporation losses are kept to a minimum, and no sealing elements, such as liners or washers, need be employed. In the preferred embodiment of our invention, closures are manufactured from "Polythene," as comparative inertness of this material to the majority of liquids makes it generally unnecessary to use any protective coating on the inner surface of the closure.

Although our invention has been described with reference to screw type closures, other closures may, of course, be manufactured in accordance with our invention. For instance, lug type closures having an annular recess on the top, as shown in Figure 6, may be manufactured and employed without the necessity of sealing discs or other sealing means.

While we have described our invention with reference to a plastic closure having an annular recess in the outer surface of the top, we may also provide a recess in the underside or sealing surface of the closure top. Such a modification is shown in Figure 5. In Figure 5, 2 represents the closure having a threaded portion 3, a top having an annular recess 4' in the undersurface thereof, and a dome 5. The geometry of the recess as shown in the drawing is merely for the purpose of illustration, and our invention, in its broad aspects, is not intended to be limited thereby, for other geometrical configurations may be followed in forming the recess. For instance, the recess may vary in geometry from substantially semi-circular to substantially semi-elliptical.

Generally speaking, the recess is advantageously curved, as this configuration increases the tear resistance of the thin section of the closure provided by the recess.

Although our invention has been described with reference to certain particular embodiments, it is to be understood that our invention is not limited thereby. Therefore, changes, omissions, substitutions, and/or additions may be made without departing from the spirit of the invention as defined in the appended claims.

We claim:

1. A container having applied thereto a closure composed of a polymerized ethylene and having a top portion carrying an annular recess so positioned that the zone of minimum thickness of said top is substantially above the sealing surface of said container said minimum thickness being less than half the maximum thickness of said top, whereby an improved seal is obtained.

2. A homogeneous plastic container cap of polyethylene having a threaded portion joined to a sealing section by means of a relatively thick and rigid portion, said sealing section having a thick and substantially rigid central portion and a thin flexible annular portion between said rigid portions, the minimum thickness of said annular portion being less than half the maximum thickness of said sealing section, the maximum thickness of said sealing section being approximately 0.125 inch.

3. A plastic container closure of the polymerized ethylene type and of homogeneous composition having a side wall carrying means for affixing the closure to a container and a top portion including a substantially centrally located substantially rigid dome surrounded by an annular recess adapted to provide a flexible section between said dome and the substantially rigid juncture of said top with the side wall, the maximum thickness of said dome being greater than twice the minimum thickness of said flexible section.

4. A plastic container cap of the polymerized ethylene type and of homogeneous composition and having a threaded side wall and a top portion including a centralized substantially rigid dome and an annular recess in the undersurface of said top portion adapted to provide a zone of flexibility in said top portion, the minimum thickness of said zone being less than half the maximum thickness of said top portion.

5. A polymerized ethylene container closure comprising a threaded side wall joined to a top by means of a substantially rigid top-side wall juncture having a thickness substantially equal to that of said side wall, said top including a flexible section provided by an annular recess, the minimum thickness of said flexible section being approximately 0.040 inch, said thickness being approximately 40% of the thickness of said side wall, and a central portion the maximum thickness of which is about 125% the thickness of said side wall.

6. A homogeneous plastic container closure of the polyethylene type and having a threaded portion capable of engaging the threads of a container and a yieldable top integral with said threaded portion and including a relatively thick and relatively rigid central portion surrounded by an annular recess substantially curved in cross section and providing in the top of said closure a flexible section, the minimum thickness of said flexible section being less than half of the maximum thickness of said top.

JOSEPH A. BENNER.
JOHN M. SHARF.

REFERENCES CITED

The following references are of record in the file of this patent:

UNITED STATES PATENTS

| Number | Name | Date |
| --- | --- | --- |
| 1,595,323 | Van Sant | Aug. 10, 1926 |
| 1,595,324 | Van Sant | Aug. 10, 1926 |
| 1,832,669 | Thomas | Nov. 17, 1931 |
| 2,054,033 | Conner et al. | Sept. 8, 1936 |
| 2,072,536 | Trickey et al. | Mar. 2, 1937 |
| 2,124,874 | Conner et al. | July 26, 1938 |
| 2,222,771 | Hoffman | Nov. 26, 1940 |
| 2,232,475 | Renfrew et al. | Feb. 18, 1941 |
| 2,399,117 | Hart | Apr. 23, 1946 |

OTHER REFERENCES

Du Pont Magazine, November-December 1944; vol. 38, No. 5; page 9.